United States Patent [19]

Carlson et al.

[11] 4,277,827
[45] Jul. 7, 1981

[54] MICROPROCESSOR BASED SYSTEM FOR THE DEVELOPMENT AND EMULATION OF PROGRAMMABLE CALCULATOR CONTROL READ ONLY MEMORY SOFTWARE

[75] Inventors: George M. Carlson, Sugarland; Michael O'Hagan, Dallas, both of Tex.

[73] Assignee: Texas Instruments Incorporated, Dallas, Tex.

[21] Appl. No.: 615

[22] Filed: Jan. 2, 1979

[51] Int. Cl.³ .................. G06F 9/00; G06F 15/02; G06F 15/20
[52] U.S. Cl. .................................... 364/200
[58] Field of Search ... 364/200 MS File, 900 MS File, 364/578, 579, 580

[56] References Cited

U.S. PATENT DOCUMENTS

| | | | |
|---|---|---|---|
| 3,938,101 | 2/1976 | Lewis | 364/200 |
| 3,997,895 | 12/1976 | Cassonnet | 364/200 |
| 4,024,386 | 5/1977 | Caudel et al. | 364/200 |
| 4,031,517 | 6/1977 | Hirtle | 364/200 |
| 4,034,347 | 7/1977 | Probert, Jr. | 364/200 |
| 4,050,058 | 9/1977 | Garlic | 364/200 |
| 4,057,847 | 11/1977 | Lowell et al. | 364/200 |
| 4,110,823 | 8/1978 | Cronshaw | 364/200 |

Primary Examiner—Gareth D. Shaw
Assistant Examiner—David Y. Eng
Attorney, Agent, or Firm—David H. Sitrick; Melvin Sharp; Richard L. Donaldson

[57] ABSTRACT

A microprocessor based system for both creating and emulating control read only memories (CROM) for use in conjunction with programmable calculators and the like. The development system operates as two independent yet integrated systems. The system generates programmable calculator key codes from source code entered via a system computer keyboard, then maps the code into the system's read/write random access memory in the proper CROM format, and generates a gate placement tape from data stored in that memory. Additionally, the system emulates a CROM for real time interconnection to the programmable calculator. Thus, actual in calculator testing of the generated key codes is made possible prior to commitment of the code to mask and permanent manufactured CROMS.

13 Claims, 9 Drawing Figures

| STATE SIGNAL NAME | CYCLE 1 (0-15) | CYCLE 2 (0-15) | CYCLE 3 (0-15) |
|---|---|---|---|
| φ1 | EACH STATE CONSISTS OF ONE φ1 AND ONE φ2 CLOCK | | |
| φ2 | | | |
| IRG | DATA VALID 13 BITS / DONT CARE | DONT CARE | DONT CARE |
| FI | DONT CARE | DONT CARE | DONT CARE / DATA VALID / DONT CARE |
| FH | DONT CARE | DONT CARE | DONT CARE / DATA VALID / DONT CARE |
| UA | DONT CARE | DATA VALID / DONT CARE | DONT CARE / DATA VALID / DONT CARE |
| LA | DONT CARE | DONT CARE | DONT CARE |

MICROPROCESSOR BASED SYSTEM FOR THE DEVELOPMENT AND EMULATION OF PROGRAMMABLE CALCULATOR CONTROL READ ONLY MEMORY SOFTWARE

BACKGROUND OF THE INVENTION

This invention relates to a special purpose computer system and more particularly to a computer system for both creating and emulating control read only memories for use in conjunction with programmable calculators and the like.

1. Field of the Invention

The Control Read Only Memory (CROM) development system operates as two independent, yet integrated, systems. First, the system generates programmable calculator keycodes from source code entered via the systems computer keyboard, then maps the code into the systems read/write random access memory in CROM format, and generates a Gate Placement Tape, such as contained within a cassette, from data stored in that memory. Secondly, the system emulates a CROM for real time interconnection to the programmable calculator. The data stored in the system memory is presented to the prgrammable calculator in the same manner as such data would be presented from a CROM, and the calculator executes and responds to the data as though the actual CROM were present within it, thereby allowing actual in-calculator testing of the generated keycodes prior to commitment of the code to masks and permanent CROMs manufactured. The CROM is a 5000 by 8 bit word calculator pre-programmed storage module used as an interchangeable addition to the programmable calculator's limited read/write memory. While many standard CROM program modules are offered, custom programs are often required by users, and provided as a custom code version of a standard Texas Instruments TMCO540 CROM. Due to the programmable calculator's limited read/write program memory storage capacity, in-calculator testing of CROM software is not possible by direct program loading due to inadequate storage.

2. Description of Prior Art

Computer system translation of keyboard entered source keycode data to CROM object code utilizing a CROM assembler, subsequent translation to a compatible Gate Placement format output, and storage on an external tape storage medium are steps utilized in the CROM development flow. Heretofore, these steps were performed as subtasks of a general purpose computer system, with the resulting Gate Placement Tape being transported to the mask generation facility, and transformed into prototype CROM masks which in turn produced prototype CROMs for actual in-calculator software debugging. Alternately, a programmable calculator could be simulated in software in the general purpose computer system and the CROM object code executed under control of the simulation program. However, this process is slow, costly and inaccurate, and only provides a partial testing of CROM object code prior to commitment to prototype CROM parts. The use of prototype CROMs for final in-calculator program debugging is costly in time and money.

SUMMARY OF THE INVENTION

The method and system of the present invention eliminates many of the constraints and reduces the software development time and cost in the CROM development flow. Additionally, the CROM emulation subsystem of the CROM development system allows actual in-calculator testing and debugging of the CROM development system generated CROM object code prior to generation of the Gate Placement Tape and creation of the actual CROMs. Thus, the time consuming and costly steps of computer simulation of calculator execution of CROM object code, and prototype CROM module development for in-calculator program testing and debugging are eliminated, thereby reducing the CROM development cycle time, as well as reducing the associated development cost.

One embodiment of the CROM development system is comprised of two integrated subsystems, the microprocessor based CROM software development subsystem, and the CROM emulator subsystem. Both subsystems share the same RAM, allowing for simultaneous program development and in-calculator testing and debugging. The microcomputer subsystem is comprised of a microprocessor central processing unit, serial input and output circuitry, interrupt controls, scratch pad memory, keyboard and video interface circuitry, CROM program storage RAM, and a permanent nonvolatile storage memory which contains the CROM development operating system software. Thus, the microcomputer subsystem is a self contained dedicated CROM development system. The CROM emulator subsystem is interfaced to the microcomputer subsystem and to the programmable calculator. Upon receipt of a CROM command from the calculator, the CROM emulator responds in a manner identical to an actual CROM, and, when required, obtains control of the CROM program storage RAM from the microcomputer subsystem by placing the central processing unit in a HOLD condition, and utilizing direct memory access interface with the RAM. The CROM emulator is comprised of four sections exclusive of RAM: Instruction decoding and timing (IRG signal decode); CROM program counter and BCD to binary conversion; external input and output buffering to the calculator interface bus; and direct memory access (DMA) controller circuitry for interface to the microcomputer subsystem and specifically to the RAM board contained therein. The operation of the programmable calculator is aided by reference to U.S. Pat. No. 3,900,722, Multichip Calculator System Having Cycle and Subcycle Timing Generators, and related patents cited therein. The CROM emulator subsystem duplicates all functions of a calculator CROM, and when used in conjunction with the CROM object code storage RAM, provides for complete CROM emulation for direct interface into the programmable calculator.

BRIEF DESCRIPTION OF THE DRAWINGS

FIG. 8, is a partial schematic diagram of an S-100 CROM emulator interface, working in conjunction with the IRG decoding and output circuit of FIG. 6, and the program counter and BCD to binary converter circuit of FIG. 7; FIG. 8 illustrating the direct memory access (DMA) controller, program counter (PC), and input-output (I/O) circuits.

The present invention is directed to an improvement in the methods of creating a debugged control read-only memory (CROM) for use in Solid State Software programmable calculators, and systems for carrying out such methods.

Figure 1:
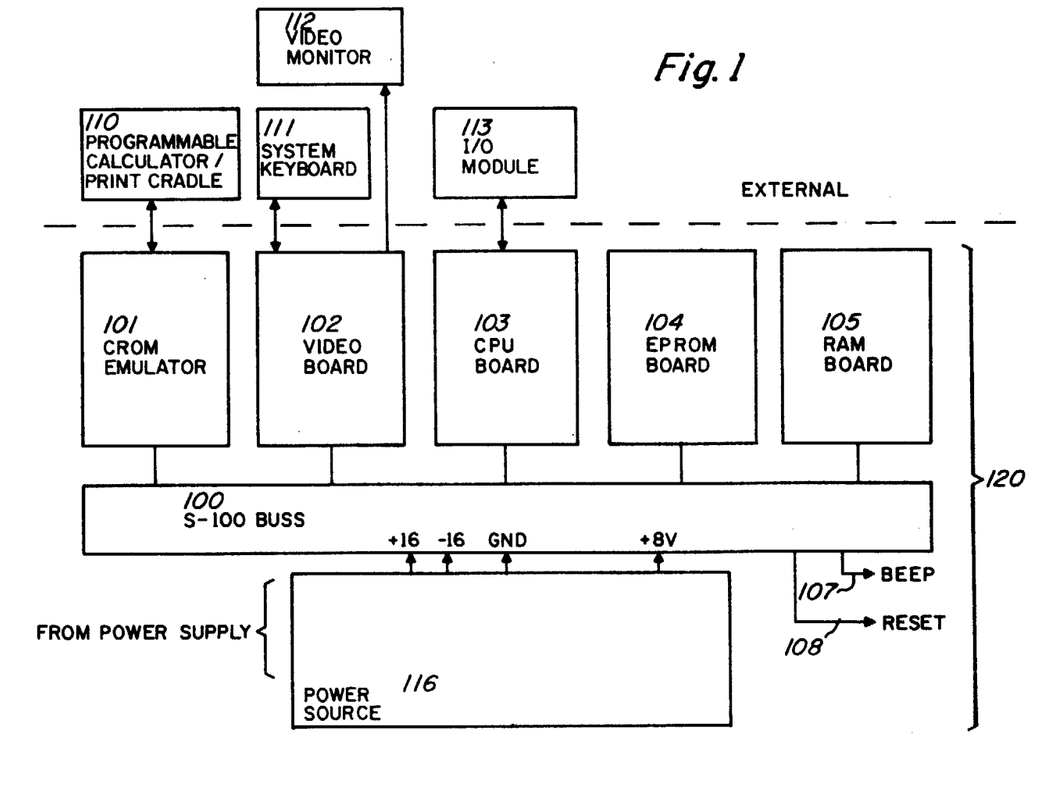
FIG. 1, is a block diagram of a control read-only memory (CROM) development system, illustrating a microprocessor mother board assembly.

DETAILED DESCRIPTION OF PREFERRED EMBODIMENTS:

Referring to FIG. 1, a block diagram of a CROM development system microprocessor mother board assembly is shown. An S-100 bus, 100, provides the mother board interconnections in system 120. However, any consistent interconnection standard may be used to effect system 120. CROM emulator board 101 is connected to S-100 bus 100 and is also connected to programmable calculator 110. Programmable calculator 110 may be any programmable calculator which utilizes a CROM such as the TI 57, TI 58, or TI 59 calculators, manufactured and sold by Texas Instruments Incorporated. Keyboard/video board 102 is connected to S-100 bus 100, and also connects to system keyboard 111 and video monitor 112. Board 102 detects and processes inputs from system keyboard 111 and outputs processed keyboard information onto S-100 bus 100. Additionally, board 102 inputs data from S-100 bus 100 and processes, formats, and outputs the formatted and processed data to video monitor 112. CPU board 103 contains the micro-processor and related support function circuitry, and is connected to S-100 bus 100 and to I/O module 113. EPROM (Erasable Programmable Read Only Memory) board 104 is connected to S-100 bus 100 and contains non-volatile memory storage of the CROM development system 120 operating system as required by CPU board 103. Additionally, EPROM board 104 may contain assembled and debugged CROM program data to be used by CROM emulator board 101. RAM board 105 is connected to S-100 bus 100, and provides read/write random access memory for CROM program data storage which is utilized by CROM emulator board 101 and the programmable calculator, as well as providing working storage, and scratch pad memory for CPU board 103. Power source 116 is connected to S-100 bus 100 and provides the necessary regulated voltages needed for operation of system 120. CROM development system 120 performs two major independent tasks. One task is to emulate a CROM and to actually verify and test a program in conjunction with the programmable calculator prior to committing the program to a Gate Placement Deck for creation of photo masks, direct slice projection, or other slice patterning means. CROM emulator board 101 accesses RAM board 105 via S-100 bus 100, and utilizes the data from RAM board 105 in its emulation of a CROM.

The other task of system 120 is to provide a programmable calculator CROM software development system which allows program entry via system keyboard 111 in text form for calculator program development. This text form calculator program is processed and assembled under control of the operating system program stored in the non-volatile memory of EPROM board 104, as utilized by CPU board 103, and the resultant object code calculator program is mapped into the memory of RAM board 105, and formatted as is required for compatibility with CROM emulator board 101 to allow CROM emulation.

A source program is entered from system keyboard 111, and is assembled into object code by CPU board 103 in conjunction with EPROM board 104, with the object code formatted and stored on RAM board 105. While this program development process is in progress, a programmable calculator may access data from RAM board 105 via CROM emulator board 101. CROM emulator board 101 utilizes direct memory access (DMA), which allows simultaneous program development and assembly plus real time assembled program debugging utilizing the programmable calculator via CROM emulator board 101 and RAM board 105. This simultaneity of functions was not heretofore obtainable with existing CROM development methods. CROM emulator board 101 is connected to programmable calculator 110 via a serial interface bus. CROM emulator 101 is connected to S-100 bus 100 via a parallel interface configured in compliance with the S-100 bus 100 standards. CROM emulator 101 interfaces with RAM board 105, or EPROM board 104, where debugged CROM data is stored; through utilization of a DMA controller circuit which initiates a DMA HOLD request to S-100 bus 100 when data is requested by the calculator 110. CPU board 103 responds with a HOLD Acknowledge signal on S-100 bus 100. Upon detection of HOLD Acknowledge signal, CROM emulator board 101 places the desired data's memory address onto S-100 bus 100, along with other necessary memory control signals. This address points to a location on RAM board 105, which responds by placing data from the addressed location onto bus 100. CROM emulator 101, upon receipt of the data from S-100 bus 100, stores the received data for processing and transmittal to the calculator 110, and releases the HOLD request signal from S-100 bus 100, which frees CPU board 103 to resume processing. With each DMA cycle a single bit is transferred from RAM board 105 to emulator board 101. The entire DMA transfer process occurs in less than 6 microseconds, and is therefore nondetectable by either users of the development system portion of system 120 or of the calculator program debugging system of system 120.

Figure 2:
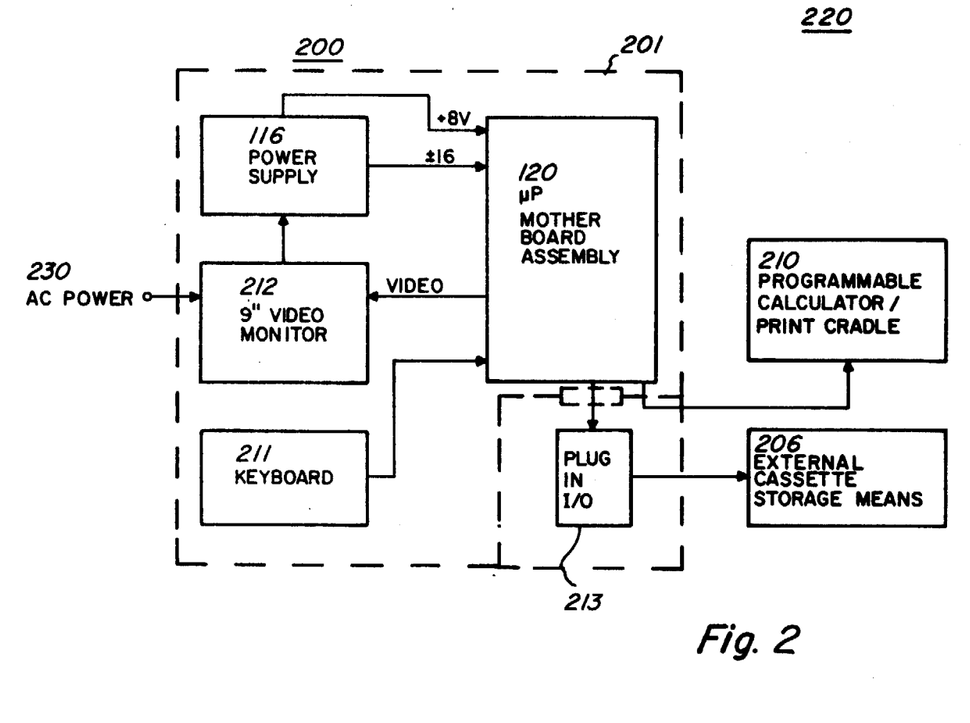
FIG. 2, is a block diagram of a CROM development system, table model system, including the microprocessor mother board assembly as shown in FIG. 1.

Referring to FIG. 2, a block diagram of the CROM development system, table model is shown. Table model system 220 is a self-contained CROM program development system comprised of microprocessor mother board assembly 120, connected to power supply 116, video monitor 212, and keyboard 211; all contained within cabinet 201. Additionally, assembly 120 has provisions for connection to an external programmable calculator/print cradle 210, and for a plug-in I/O interface module 213. I/O interface module 213 provides interface capability with an external cassette recorder, TI Silent 700 Computer terminal, or RS-232 interface, allowing for external program storage for assembled object code, which is used in conjunction with creating an object Gate Placement Deck. CROM program development system 200 allows CROM programs to be developed via data entry from keyboard 211, and is capable of performing CROM program development on a stand-alone basis without modules 210, 213 or 206. However, programmable calculator/print cradle 210 is used in order to effectuate real time calculator debug of developed and assembled CROM programs. Further, plug in I/O interface module 213 and external cassette storage means 206 are used to obtain nonvolatile, transportable object code storage and are further required to provide a Gate Placement object code cassette necessary for mask preparation and slice processing. An external AC power source 230 is connected to video monitor 212 and power supply 116.

Figure 3:
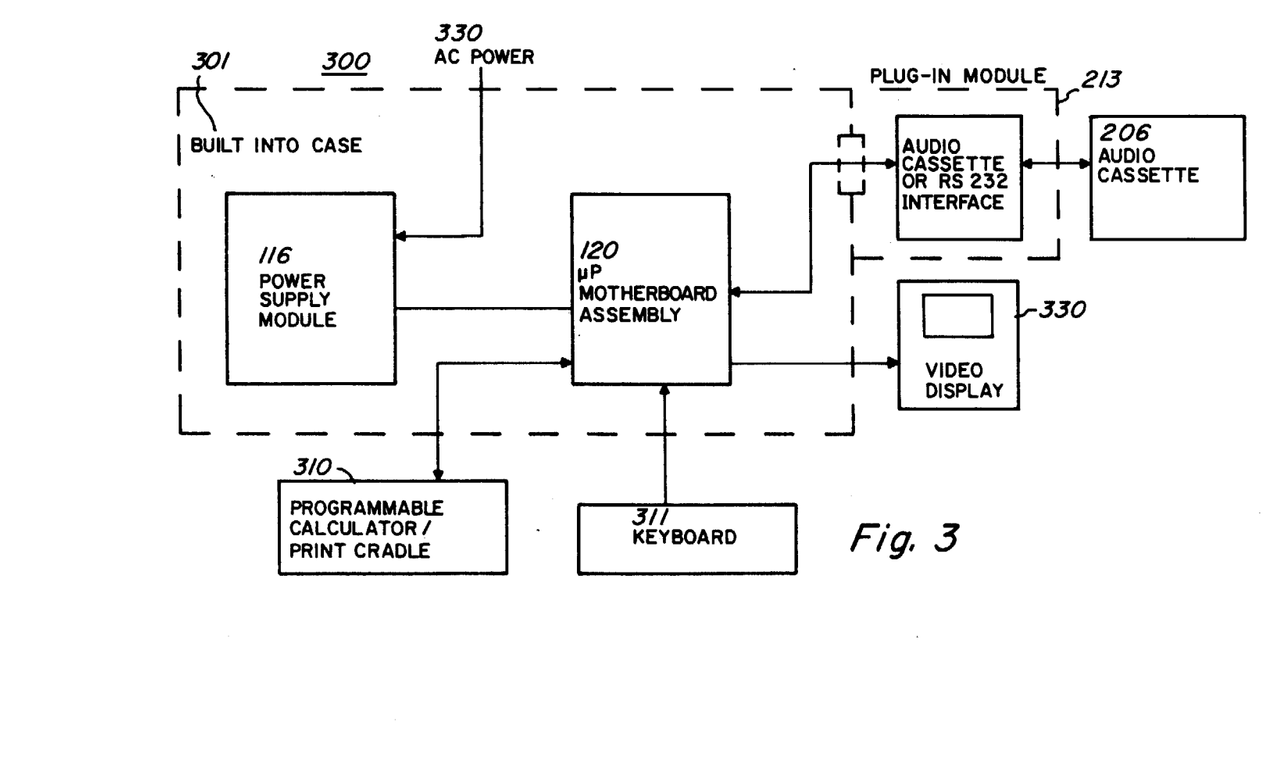
FIG. 3, is a block diagram of a CROM development system, portable model system, including the microprocessor mother board assembly as shown in FIG. 1.

Referring now to FIG. 3, a block diagram of the CROM development system portable model is shown. Portable model 300 is comprised of a portable case 301, which contains built-in power supply module 116, and microprocessor mother board assembly 120. Additionally, mechanical provision is made for interconnection from case 301 to plug-in module 213, video display 330, keyboard 311, and programmable calculator 310. Power supply 116 is connected to an external AC power source 330, and to the microprocessor mother board assembly 120. Power supply 116 provides all necessary transformation and regulation functions to provide assembly 120 with proper supply voltages. Mother board assembly 120 has provisions for connection to plug in I/O interface module 213, video display 330, keyboard 311, and programmable calculator/print cradle 310. Plug in I/O interface module 213 has provision for connection to an external audio cassette storage means 206, or other equivalent cassette storage means, such as that contained in TI Silent 700 terminal, or other RS-232 interfaced storage means. Case 301 has mechanical provisions to allow for storage of programmable calculator/print cradle 310, keyboard 311, video monitor 330, plug-in module 213, and audio cassette recorder 206, thus providing a portable and transportable CROM development system.

Figure 4:
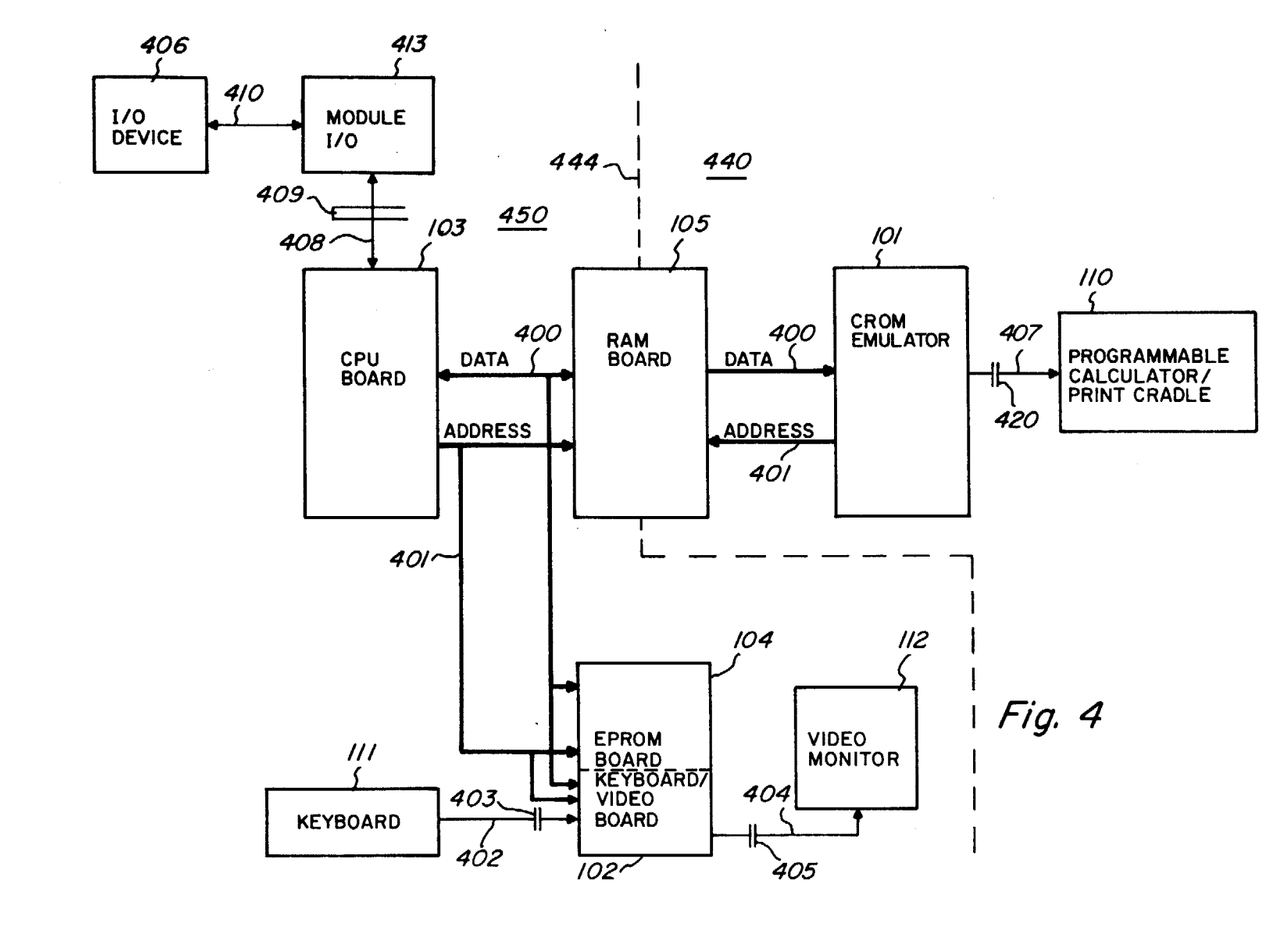
FIG. 4, is a block diagram of the CROM development system as shown in FIGS. 2 and 3, illustrating the data flow paths.

Referring now to FIG. 4, a block diagram illustrating the data flow through the CROM development system of FIG. 1, is shown. Data bus 400 and address bus 401 are subsets of S-100 bus 100, and are connected to all boards connected thereto. Thus, CROM emulator board 101, keyboard/video board 102, CPU board 103, EPROM board 104, and RAM board 105, are all connected to data bus 400 and address bus 401. CPU board 103 outputs and inputs data via data bus 400 to video board 102, EPROM board 104, and RAM board 105. Additionally, CPU board 103 outputs address information via address bus 401 to video board 102, EPROM board 104, and RAM board 105. CPU board 103 communicates via a separate bi-directional bus 408, via connector 409, to I/O interface module 413. I/O interface module 413 is connected to an external I/O device 406, such as cassette recorder, via bi-directional interface bus 410. Keyboard 111 is connected to video board 102 via bus 402 via external connector 403. Bus 402 is a unidirectional bus, providing data input to the keyboard/video board 102. Video board 102 is connected to external connector 405 and therefrom via unidirectional bus 404 to video monitor 112. Composite video is transmitted via bus 404 to the input of video monitor 112. CROM emulator board 101 outputs address information via address bus 401 to RAM board 105, (or if EPROM is used for CROM data storage to the EPROM board containing the CROM data) and the corresponding data from RAM board 105 is output via data bus 400 to CROM emulator board 101. CROM emulator board 101 is connected via external connection 420 via bus 407 to programmable calculator/print cradle 110. Dotted line 440 shown as passing through the RAM board 105, illustrates the division of task responsibility of the CROM development system. The CROM software development system 450 is a complete stand-along system which does not require CROM emulator board 101, or programmable calculator/print cradle 110. The purpose of system 450 is to assemble the program entered via keyboard 111 and provide user feedback via monitor 112. Additionally, the assembled code is mapped into RAM board 105 in accordance with the specification of the CROM itself. The assembled program may be stored on cassette via I/O module 413, and cassette storage device 406, or may be transmitted via an acoustic coupler used in place of I/O cassette device 406. Additionally, programs may be retrieved from cassette storage device 406 via I/O module 413, and restored to RAM board 105. Additionally, system 450 provides capability to absolutize code once the code has been debugged. Thus, relative addressing modes, i.e., labels, are eliminated and replaced with absolute addresses, thus reducing the number of programs steps and speeding program execution.

CROM emulator system 440 is also a self-contained, independent system, which does not require video board 102, CPU board 103, EPROM board 104 (except where the assembled program is stored on EPROM and EPROM board 104 used in place of RAM board 105), CPU board 103, I/O module 113, I/O device 406, keyboard 111, or video monitor 112. Thus, emulator system 440 can function as two boards; a memory board 105 (or 104), and CROM emulator board 101, interfaced to the programmable calculator/print cradle 110. However, the two independent parts of the system, 440 and 450, may be utilized simultaneously and harmonously in the same system, thus resulting in an integrated multifaceted development system.

Figure 5:
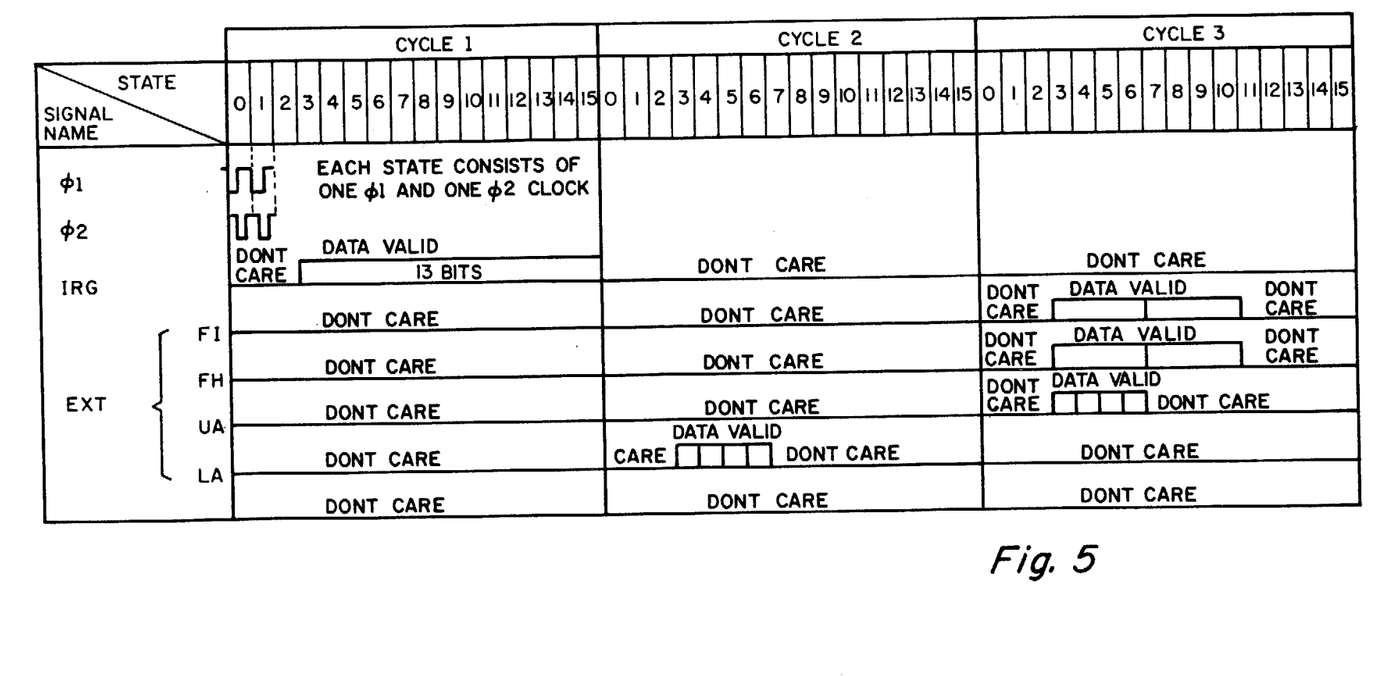
FIG. 5, is an instruction cycle machine state timing diagram of a programmable calculator CROM interface.

Referring to FIG. 5, a detailed CROM machine state timing diagram is shown. A Programmable Calculator instruction cycle is comprised of three machine cycles. Each machine cycle is comprised of 16 clock machine states, S0 to S15. Each clock state consists of two clock phases, phase 1 and phase 2. Interface between the CROM and Programmable Calculator is comprised of power supply connections VSS, VDD and VGG, clock phase interconnections Phase 1 and Phase 2, timing synchronization interconnection IDLE, instruction register word serial input bus IRG, and bidirectional serial data bus EXT which is utilized for address input and output and data output. The TMCO540 CROM is a read only memory, containing 5,000 8-bit words, and having on chip communications interface logic providing direct interface with the TMCO500 chip set interface standard used by the TI Programmable Calculators. IRG bus is a continuously monitored serial instruction word input. Upon recognition of one of four commands to the CROM, the EXT bus is utilized to receive four bits of an address or to transmit 4 bits of the present address or 8 bits of keycode push data. The internal address counter in the CROM is a four digit binary coded decimal (hereinafter referred to as BCD). Four instructions are recognized by the CROM. Each instruction consists of a thirteen bit code, serially transmitted via the IRG bus. Two instructions cause data to be transmitted via the EXT bus, fetch and increment (FI) and fetch high (FH) instructions. The load address instruction (LA) results in the on chip CROM program counter being loaded with one BCD digit, the data transmitted from the calculator via the EXT bus. Unload address (UA) results in the CROM transmitting one BCD digit of program counter address information via the EXT bus to the calculator. Instruction timing for each of these instructions on the IRG bus and EXT bus is shown in FIG. 4. Instructions are transmitted on the IRG bus to the CROM during states 3 to 15 of cycle 1 of the calculator instruction cycle. On Phase 1 clock of each state 3 to 15, a new bit of information is transmitted. The 13 bit instruction is decoded by the CROM (or CROM emulator board) and if a valid instruction is detected, proper communication interface with the calculator is prepared for cycle 2 or cycle 3 of the current instruction cycle. Upon receipt of an FI instruction, the 8 bit keycode push data currently addressed by the CROM address program counter is serially loaded to the EXT bus during cycle 3, states 3 to 11, least significant bit (hereinafter referred to as LSB), being transmitted first during state 3 of cycle 3. A new data bit is transmitted during each state (state 3 to state 7). On cycle 1 of the next instruction cycle, the internal address counter is incremented and an internal load address pointer is reset to 0 to point to the least significant digit of the four BCD digit counter. Upon detection of a fetch high (FH) instruction, the CROM loads the most significant four bits of the eight bit keycode push data word presently addressed by the CROM address counter to the EXT bus, serially loading the data during cycle 3 states 3 to 7, with the least significant bit of the four most significant bits being loaded first during state 3. During states 7 to 11 of cycle 3, four zeros, or the most significant four bits, are loaded on the EXT bus. The address counter is not incremented nor is the load address pointer reset as a result of the FH instruction. Upon detection of a load address instruction (LA), the CROM chip loads one BCD digit (four bits) from the EXT bus to the CROM address program counter digit enabled by the load address pointer. The four bit BCD address digit is transmitted from the calculator via the EXT bus to the CROM during clock states 3 to 7 of machine cycle 2, least significant bit first. The CROM load address pointer is incremented upon completion of the transmitted digit loading into the CROM address counter. Upon detection of the unload address instruction (UA), the CROM address counter digit pointed to by the CROM address pointer is transmitted from the CROM to the calculator via EXT bus during states 3 to 7 of machine cycle 3, least significant bit first. Upon completion of the address counter digit transmission from the CROM, the CROM load address pointer is incremented. The CROM emulator board 101 of FIG. 1, in conjunction with RAM board 105, decodes and processes these four instructions and interfaces to the calculator via the calculator CROM interface bus lines to effectively duplicate an actual CROM.

Figure 6A:
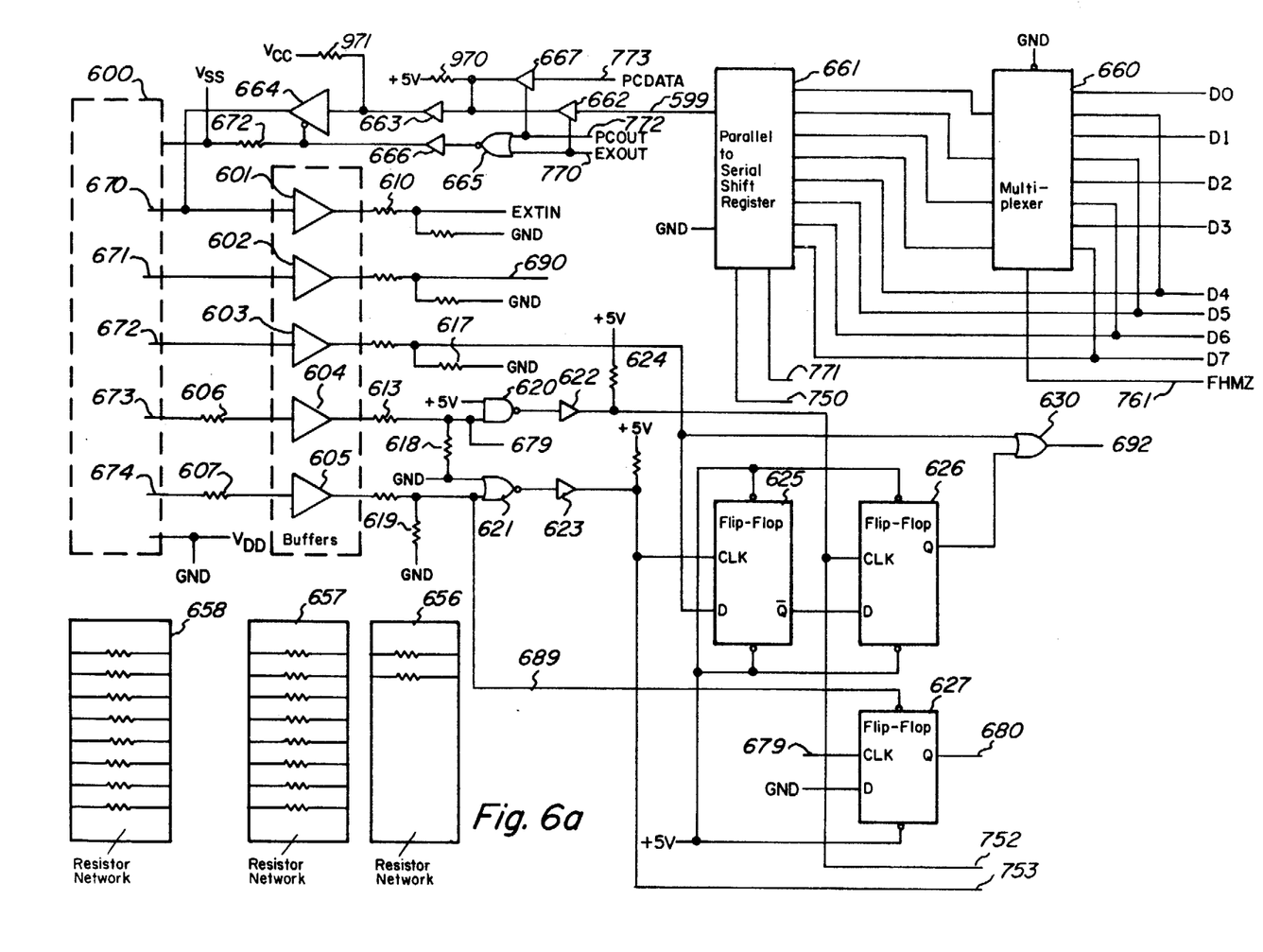
FIGS. 6A and 6B are partial schematic diagrams of an S-100 to CROM emulator interface, illustrating the instruction register (IRG) decoding and output circuits.
Figure 6B:
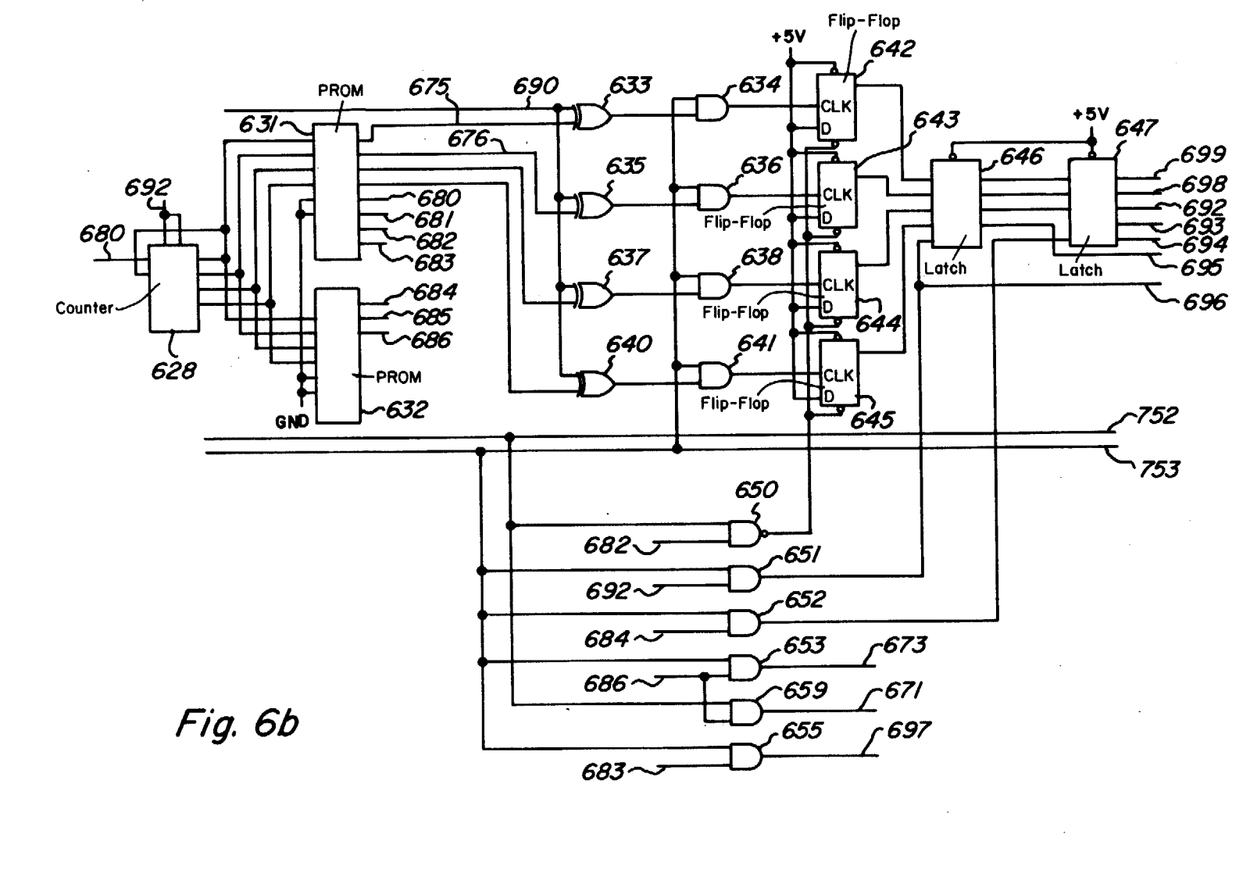
Figure 7:
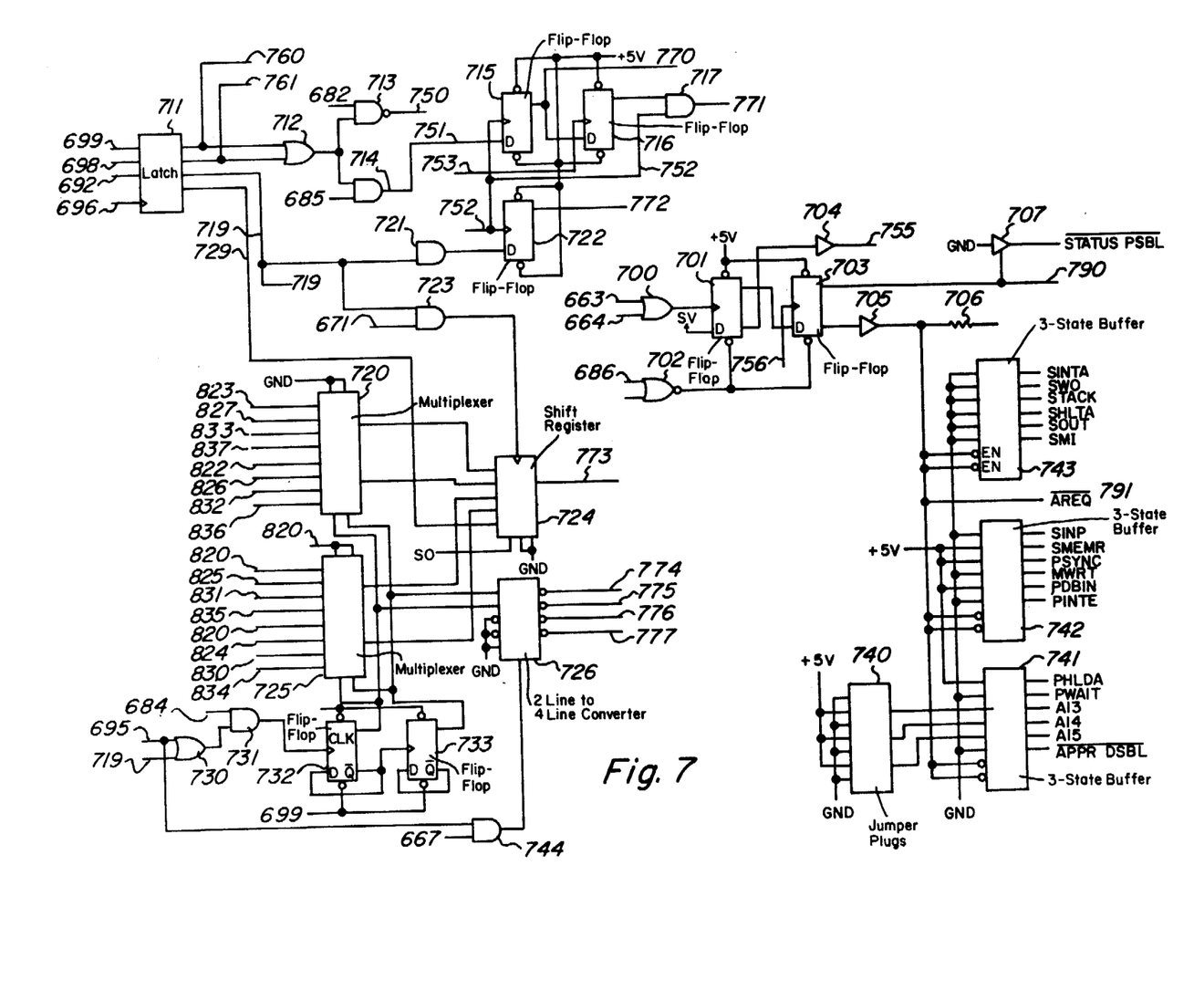
FIG. 7, is a partial schematic diagram of an S-100 CROM emulator interface, illustrating the program counter and binary coded decimal (BCD) to binary conversion circuitry, and working in conjunction with the IRG decoding and output circuits portion of the S-100 CROM emulator interface, as shown in FIG. 6.
Figure 8:
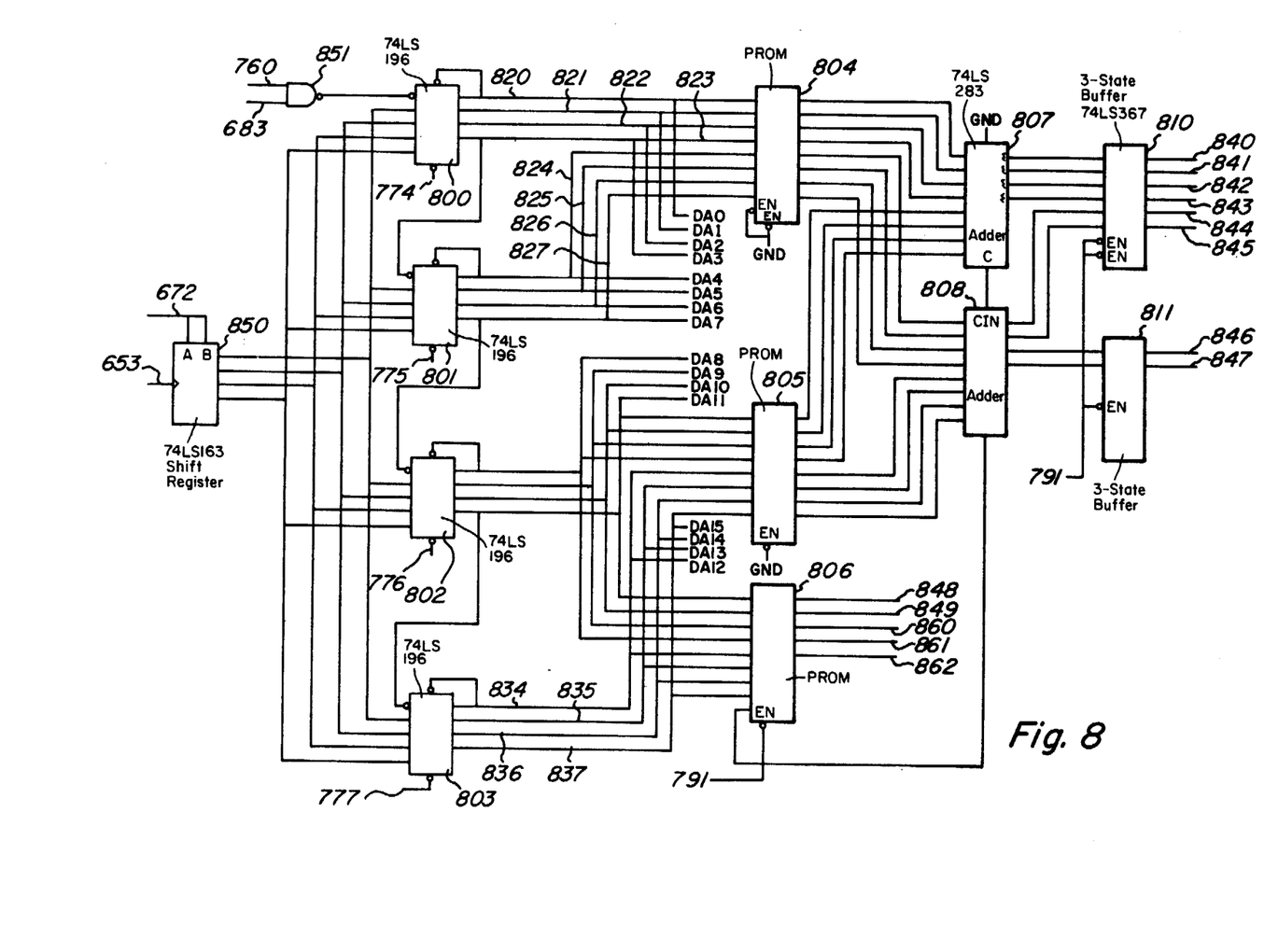

Referring to FIGS. 6, 7 and 8, a detailed schematic diagram of CROM emulator 101 from FIG. 1, is shown. FIG. 6 is a detailed schematic of the IRG decoding, timing, and output circuits; FIG. 7 is a detailed schematic of the DMA controller, load address pointer, and program counter input-output circuits; and FIG. 8, is a detailed schematic of the CROM program counter and BCD to binary conversion circuitry.

Referring to FIG. 6, a detailed schematic of the IRG decoding, timing and output circuits of the CROM emulator board of 101 is shown. Interconnection to the external calculator is via connector 600. Signals to and from connector 600 are buffered and level shifted from the calculator ten volt signal swing levels to TTL signal levels compatible with the CROM emulator board logic circuitry, and from the TTL CROM emulator board signal levels to the ten volt signal swing levels required by the calculator. The power supply for the buffer/level shifter circuitry associated with connector 600 is provided by the calculator power source via the calculator power bus of connector 600. This assures compatible interface signal levels will result from the buffer/level shifting circuitry. EXT, 670, is a bidirectional serial data bus used for the transfer of data within and to the calculator. EXT signal, 670, at connector 600, and connected to the input of buffer 601, has a ten volt signal swing (as output from the calculator). The voltage at the output of buffer of 601, which also has a ten volt swing, is connected to resistor 610, which, in conjunction with resistor 615, comprises a voltage divider network that lowers the output signal to a TTL level. The output of the voltage divider network comprised of resistor 610 and 615 is a TTL level signal EXTIN, 672, which is connected to other circuitry of the CROM emulator board 101. Data transmission back to the calculator from the CROM emulator board requires buffering and level shifting from the TTL signal levels of CROM emulator board 101 to the programmable calculator via EXT signal 670, via connector 600. This buffering and level shifting is performed by a circuit which is comprised of a three state buffer 662 OR Gate 665, buffer 663, and three state buffer 664. There are two types of data transmitted from the CROM emulator board 101 to the programmable calculator via the EXT signal 670. PC data, 773, is the program counter data originating on the CROM emulator board from the program counter circuitry as shown in FIGS. 7 and 8. There is also keycode date, 599, which originates on RAM board 105, and is transferred via S-100 bus 100, via multiplexer 660 and shift register 661 to the input of three state buffer 662. The parallel data from RAM board 105 is latched into shift register 661 and serially output from register 661, as keycode data 599. When buffer 662 is enabled, keycode data 599 is output to conductor 669, and therefrom to the input of buffer 663. Alternatively, when three state buffer 667 is enabled, PC data 773 is output from 667 to conductor 669, and therefrom to the input of buffer 663. Resistor 970 is a pull-up resistor for signal noise reduction. Control signals, from FIG. 7, PC out 772, and EX out 770, enable three state buffers 667 and 662, respectively, to an active buffer state, thereby transferring information from the buffer's input to output. When not enabled, buffers 662 and 667 outputs are nonactive in a high impedance floating state, irrespective of the input information. The EXT output level shifter buffer 664, is enabled to pass information when either PC out 772 or EX out 770 is at an active high signal level. PC out 772 and EX out 770 are connected to the inputs of NOR gate 665. If either input signal is at a high level, NOR gate 665 outputs a low level signal, which is connected to the input of noninverting buffer 666. The output of 666 follows its input, and is connected to the output enable control of three-state buffer-level shifter 664. The output of buffer 666 is also connected to resistor 672 which provides voltage level pull up for signal level compatibility. When the output of 665 is low, buffer output 666 is low, and buffer 664 is enabled, passing data from its input to its output, which is connected to EXT 670 on connector 600. Buffer 664 may be a CMOS device such as an 80C97, or other appropriate three-state output device operating at the appropriate voltages.

Buffers 664, 601, 602, 603, 604 and 605 are powered by the calculator power supply via connector 600. This prevents signal level mismatch between the calculator and CROM emulator board 101.

IRG signal 671, from the calculator, via connector 600, is connected to the input of buffer 602. The output of 602 is connected to resistor 611, which, in conjunction with resistor 616, level shifts the IRG signal 671, which is output from buffer 602 to a TTL level signal 690. IRG 690 is connected to one input each of exclusive or gates 633, 635, 637 and 640, for comparison and decode of the instruction received from the calculator via the signal IRG 690. A second input of each of gates 633, 635, 637 and 640, is connected to outputs 675, 676, 677 and 678, respectively, of decode pattern from 631.

IDLE signal 672 from the calculator via connector 600 is connected to the input of buffer 603. The output of buffer 630 is connected to resistor 612, which, in conjunction with resistor 617, forms a voltage divider and performs level shifting to a TTL level IDLE signal 691, which is connected to a data input of flip flop 625, and to one input of NOR gate 630, for purposes of machine state zero detection and decode. $\phi$ 1 clock signal 673 from the calculator via connector 600 is connected to current limiting resistor 606, and therethrough is connected to the input of buffer 604. The output of 604 is connected to resistor 613, which, in conjunction with resistor 618, forms a voltage divider which level shifts the $\phi$1 clock to a TTL level signal 679. $\phi$ 1 signal 679 is connected to the input of gate 620 which is configured as an inverting buffer. The output of NAND-gate 620 is connected to the input of buffer 622, which provides additional output drive. $\phi$ 1 752 is output from buffer 622, and is connected to pull up resistor 624, to the clock input of flip flop 626, and to one input each of NAND gate 650 and 654. $\phi$ 1 679 is also connected to the clock input of flip flop of 627.

Clock signal $\phi$ 2, 674, from the calculator via connector 600, is connected to current limiting resistor 607, and therethrough to the input of buffer 605. The output of buffer 605 is connected to resistor 614, which, in conjunction with resistor 619, performs the TTL level shifting function. The level shifted $\phi$ 2 signal 689 is connected to the input of NOR gate 621 which inverts the $\phi$ 2 signal 689 and is connected to the preset input of D flip flop 627. The data input of flip flop 627 is tied to ground, so that upon the low to high level transition of $\phi$ 1 679, the noninverting output of flip flop 627 is brought to a low logic level. The noninverting output of flip flop 627 is connected to the clock input of modulo 16 counter 628. Counter 628 outputs a 4 bit binary code indicative of the current machine state within the machine cycle of the instruction cycle which is presently being executed. During the same machine state of the same cycle in which $\phi$ 1 679 has clocked flip flop 627, but subsequent thereto, $\phi$ 2 689, which is connected to the preset input of flip flop 627, presets the noninverting output of flip flop 627 to a high level signal, preparing flip flop 627 to respond to the next machine state $\phi$ 1

679 signal. $\phi$ 2, 689, which is connected to the input of NOR gate 621, is inverted by NOR gate 621. The output of NOR gate 621 is connected to the input of buffer driver 623. $\overline{\phi\ 2}$ 753 output from buffer driver 623, is connected to signal level pull up resistor 629, which provides noise immunity $\overline{\phi\ 2}$ 753 is also connected to the clock input of flip flop 625, to one input each of NAND gates 651, 652, 653, 655, and to one input each of NAND gates 634, 636, 638 and 641, and to other parts of the CROM emulator circuitry. Flip flop 625 samples and latches the IDLE signal 691, connected to its D inputs in response to the low of high level transition of $\overline{\phi\ 2}$ 753. During a calculator active-busy mode, IDLE 691 is at a low logic level until state 15 of machine cycle, at which time it goes to a high signal level and stays at a high signal level through state zero of the subsequent clock cycle. During Phase 1 of state zero of the subsequent clock cycle, the inverting output of flip flop 625 is at a low logic level. The inverting output of flip flop 625 is connected to the D input of flip flop 626, and is sampled and latched into flip flop 626 in response to the low level to high level signal transition of $\overline{\phi\ 1}$ 752. The noninverting output of flip flop 626, which is connected to 1 input of NOR gate 630, is at a high logic level during state zero of each machine cycle. The other input of NOR gate 630 is connected to IDLE signal 691. When IDLE 691 and the noninverting output of flip flop 626 are both high, indicating state zero of a machine cycle, the output 692 of NOR gate 630 goes to a high level, thereby clearing counter 628. When IDLE 691 goes low at the end of state zero, output 692 of gate 630, goes back to a low level, thereby enabling counter 628.

The four bit output of state counter 628, representing the present machine state, is connected to address inputs of instruction emulator state decoder PROM (Programmable Read Only Memory) 631, and is also connected to the address inputs of state decoder PROM 632. PROM 631 converts the four bit present state pattern output from counter 628, connected to the input of PROM 631, into separate outputs of emulated bit patterns for the four valid CROM instructions and outputs these instruction bit patterns fetch 675, fetch high 676, unload address 677, and load address 678, to one input each of exclusive ORgates 633, 635, 637 and 640, which continuously compare the incoming instruction bit pattern on IRG 690 to one of the four recognized bit patterns output from PROM 631, the output of an exclusive OR gate remaining at a zero level so long as its input bit patterns match, but going to a high signal level if the incoming bit pattern from IRG 690 differs from the PROM 631 output bit pattern. The outputs of exclusive OR gates 633, 635, 637 and 640, are connected to one input each of AND gates 634, 636, 638 and 641, respectively. The other input of AND gates 634, 636, 638 and 641, are commoned and connected to $\overline{\phi\ 2}$ 753. The outputs from exclusive OR gate 633, 635, 637 and 640, are sampled during the high signal level portion of $\overline{\phi\ 2}$ 753, and if the output from exclusive OR gate 633, 635, 637 or 640, is at a high signal level during the high signal level portion of $\overline{\phi\ 2}$ 753, then the output of AND gate 634, 636, 638 or 641, respectively, will correspondingly go to a high signal level. A low to high signal level transition on the output of AND gate 634, 636, 638 or 641, will cause flip flop 642, 643, 644 or 645, respectively, to latch a high level signal, and to output the latched high level signal on its noninverting output. The noninverting outputs from flip flops 642, 643, 644 and 645, are fed in parallel to the four data inputs of flip flop latch 646, which latches in the four data bits at $\overline{\phi\,2}$ high state zero of cycle 2 in response to the state zero $\overline{\phi\,2}$ clock signal 696, connected from the output of AND gate 651 to the clock input of latch 646. State zero signal 692, and $\overline{\phi\,2}$ signal 753 are connected to one input each of AND gate 651, so that upon state zero 692 and $\phi\,2$ 753 both being at a high signal level, the output of gate 651 goes to a high signal level, thereby clocking latch 646. PROM 631 and PROM 632, also provide machine state decode outputs: State 2 to State 5 signal, S0 - S5, 680; State 1 signal, S1, 686, State 2, S2, signal 682, State 7 signal, S7, 683, output from PROM 631; and State 15 signal, S15, 684, State 2 signal-State 9 signal, S0-S9, 685, and State 3-State 6 signal, S3-S6, 686, output from PROM 632. These state decode outputs from PROM 631 and 632 correspond to state times represented by the outputs of the modulo 16 present state counter 628, which are connected to the inputs of PROMs 631 and 632. The address input to data output decode logic tables for PROM 631 and PROM 632, are shown in Table 1 and Table 2, respectively. State 2 signal 682, is connected to one input of NAND gate 650, the other input of NAND gate 650 is connected $\overline{\phi\,1}$ 752, and the output of NAND gate 650, which goes to a low signal level when state 2 signal 682 and $\overline{\phi\,1}$ signal 752 are both at high signal levels, is connected to the clear inputs of flip flops 642, 643, 644 and 645, thereby clearing the contents of these flip flops during the $\overline{\phi\,2}$ clock pulse of state 2 of cycle 2 of an instruction cycle. State 15 signal 684, is connected to one input of AND gate 652; the other input of AND gate 652 is connected to $\overline{\phi\,2}$ signal 753, and the output of AND gate 652, which goes from a low signal level to a high signal level when state 15 signal 684 and $\overline{\phi\,2}$ signal 753 are both at a high signal level, is connected to the clock input of latch 647. State 3 to state 6 signal 686, is connected to one input each of AND gates 653 and 654.

TABLE 1.

| PROM 1: | |
|---|---|
| Address | Data |
| 0 | 00 |
| 1 | 20 |
| 2 | 50 |
| 3 | 10 |
| 4 | 1F |
| 5 | 1F |
| 6 | 0F |
| 7 | 85 |
| 8 | 06 |
| 9 | 00 |
| A | 00 |
| B | 00 |
| C | 0F |
| D | 00 |
| E | 0F |
| F | 00 |
| 10-1F | All Zeros |

TABLE 2.

| PROM 2: | |
|---|---|
| Address | Data |
| 0 | 00 |
| 1 | 00 |
| 2 | 02 |
| 3 | 06 |
| 4 | 06 |
| 5 | 06 |
| 6 | 06 |
| 7 | 02 |
| 8 | 02 |
| 9 | 02 |
| A | 00 |
| B | 00 |
| C | 00 |
| D | 00 |
| E | 00 |
| F | 01 |
| 10-1F | All Zeros |

The other input of AND gate 653 is connected to $\overline{\phi\,2}$ 753, while the other input of AND gate 654 is connected to $\overline{\phi\,1}$ 752. The output of AND gate 653, state 3 to state 6 $\overline{\phi\,2}$ signal 673, which is at a high signal level when input state 3 to state 6, 686, and input $\overline{\phi\,2}$, 753, are both at a high signal level, is connected to other portions of the CROM emulator circuitry as shown in FIGS. 7 and 8. State 7 signal 683, is connected to one input of AND gate 655, while the other input and AND gate 655 is connected to $\overline{\phi\,2}$ 753, and the output of AND gate 655, state 7 $\overline{\phi\,2}$ signal 697, which is at a high signal level when both its inputs are at a high signal level, is connected to CROM emulator circuitry as shown in FIGS. 7 and 8.

When the input bit pattern of signal IRG matches one of the PROM 631 output instruction bit patterns fetch 675, fetch high 676, unload address 677, or load address 678, the corresponding flip flop 642, 643, 644 or 645, respectively, outputs a low level signal on its noninverting output corresponding to an instruction match. At $\overline{\phi\,2}$ of state zero of cycle 2, the noninverting outputs of instruction match flip flops 642, 643, 644 and 645, are latched into latch 646. This latched data corresponds to instruction input decode, a low signal level corresponding to a valid instruction decode. The latched signals corresponding to the fetch, fetch high, and unload instructions are connected from the outputs of latch 646 to the inputs of latch 647, whereupon $\overline{\phi\,2}$ (high level) of state 15 of cycle 2 the data at the inputs to latch 647 is latched and stored. The load instruction decode data bit stored in latch 646 is output as signal LDM1 695, to other parts of the CROM emulator circuitry as shown in FIGS. 7 and 8, in conjunction with enabling program counter 800, 801, 802 and 803, of FIG. 8, via load enable signals 774, 775, 776 and 777, of FIG. 7, in preparation for program counter data loading from the calculator which occurs during states 3 to 7 of cycle 2. Latch 647 outputs the instruction decode signals to be used during cycle 3, the outputs corresponding to the instruction decode of fetch-$\overline{\text{FMID}}$ 699 and $\overline{\text{FMID}}$ 693, fetch high-$\overline{\text{FHIMD}}$ 691 and FHIMD 694, and unload address-$\overline{\text{UMID}}$ 692. These outputs are connected to other parts of the CROM emulator circuitry as shown in FIGS. 7 and 8.

Referring now to FIG. 7, instruction decode outputs 699, 698 and 692, from latch 647 of FIG. 6, are connected to the data inputs of Cycle 3 latch 711. Signal 696 is connected to the clock input of latch 711, thereby causing the data inputs to latch 711 to be stored and latched into latch 711 during $\phi\,2$ of state zero of the clock cycle. Thus, the outputs of latch 711 provide the instruction decode status, valid by state 1 of cycle 3, allowing adequate processing and decode time for the CROM emulator circuitry to prepare for a cycle 3 transfer from the CROM emulator board to the programmable calculator, which transfer commences at state 3 of cycle 3. The outputs of latch 711, corresponding to the instruction decode of fetch-FM 2 760, fetch high FHM2 761, and unload address-UNLMD 719 and UNLMD 729 are connected to other parts of the CROM emulator circuitry of FIGS. 6, 7 and 8. Latch 711 output 760 is connected to one input of OR gate 712, and is also connected to one input of NAND gate 851 of FIG. 8. Output 761 of latch 711 is connected to the other input of OR gate 712, and is also connected to the multiplexer control input of multiplexer 660, which during a fetch high instruction, causes the most significant four data bits of keycode data to be output from multiplexer 660, the outputs of multiplexer 660 connecting to the least significant four bits of input of shift register latch 661. This causes the most significant four bits of the keycode data word to be latched into the least significant four bits and most significant four bits position of shift register latch 661, thereby causing the most significant four bits of keycode data to be shifted out from register 661 during states 3 to 6, and during states 7 to 10, of cycle 3 in accordance with the CROM programmable calculator standard requirements. If either a fetch or fetch high instruction is decoded, the output of OR gate 712 goes to a high signal level. The output of OR gate 712 is connected to one input each of NAND gates 713 and 714. State 2 signal 682 is connected to the other input of NAND gate 713, thereby causing a high to low level pusle clock signal to occur during state 2 of cycle 3 of a fetch or fetch high instruction. The shift 750 output of NAND gate 713 is connected to the shift-load input of shift register-latch 661, causing the data at the inputs to device 661 to be latched at state 2 of cycle 3 of a fetch or fetch high instruction and thereafter enabling device 661 to function as a shift register when signal 750 returns to a high signal level subsequent to state 2 (when state 2 signal 682 turns to a low signal level). The other input of AND gate 714 is connected to state 2 to state 9, 685, the output of AND gate 714 going to a high signal level during states 2 to 9 of cycle 3 of a fetch or fetch high instruction. Output 751 of AND gate 714 is connected to the data input of flip flop 715. $\overline{\phi 1}$ clock signal 752 is connected to the clock input of flip flop 715, so that on the low to high level transition of $\overline{\phi 1}$ 752, of each machine state, output 751 connected to the D input of flip flop 715 is latched into 715 and output in noninverted form on the noninverting Q output of flip flop 715. The data at the D input of 715 at $\overline{\phi 1}$ 752 clock signal, is output from the noninverting Q of output of 715 as EXOUT signal 770, which is connected to the D input of flip flop 716, to the three state control of decode data buffer 662, and to the input of NOR gate 665, which therefrom controls the data out buffer 664, which is connected to the EXT bus of connector 600 and therefrom to the calculator. The clock input of flip flop 716 is connected to Phase $\overline{\phi 2}$ signal 753, so that upon the $\overline{\phi 2}$ 753 signal low level to high level transition, EXOUT 770 is latched into and stored in flip flop 716 during the same machine state of the same cycle as the signal was stored within flip flop 715. The noninverting Q output of flip flop 716 is connected to one input of AND gate of 717, the other input of AND gate of 717 is connected to the $\overline{\phi 1}$ clock signal 752, so that the data output from flip flop 716 acts as a gating signal for the clock pulse $\overline{\phi 1}$ 752 of the machine state subsequent to that in which the data was stored within flip flop 716. The output of AND gate 717, OUT CLOCK 771, is connected to the shift clock input of shift register 661. Upon each OUT CLOCK 771 pulse, the data stored in shift register/latch 661 is shifted one bit position, so that upon each OUT CLOCK 771 pulse the next most significant bit is output as keycode data 599 which is connected to the input of three state buffer 662 and therefrom passes to the EXT bus 670 of connector 600 when EXOUT signal 770 is at a high level enabling buffer 662 and 664 to pass the keycode data 599 therethrough. Keycode data 599 is output one bit for each state commencing at state 3 of cycle 3 through state 10 of cycle 3, each successive bit being output upon the shift command via OUT CLOCK 771, until all eight bits which are latched in register latch 661 are shifted out via output 599 keycode data. At state 10 of cycle 3, S0-S9 input 685 to AND gate 714 goes to a low logic level, thereby causing output 751 to go to a low logic level, which is clocked into flip flop 715 upon the $\overline{\phi 1}$ 752 positive pulse. A low logic level is output via the noninverting output of flip flop 715 to the D input of flip flop 716, where it is latched and stored upon the positive transition of the $\overline{\phi 2}$ signal 753, thereby causing the noninverting output of flip flop 716 to go to a low signal level which is connected to the input of AND gate 714, thereby inhibiting any further $\overline{\phi 1}$ 752 clock pulses from being output as OUT CLOCK 771 from AND gate 717, thereby causing the shift pulse to shift register 661 to cease. During a load or unload command, signal 695 or 719, respectively, will be at a high logic level signal, and are connected to the inputs of OR gate 730, causing the output of OR gate 730 to go to a high signal level. The output of OR gate 730 is connected to one input of AND gate 731, the other input of AND gate 731 is connected to the state 15 signal 684, so that when state 15, 684, of the present clock cycle goes to a high signal level (during state 15), the output of AND gate 731 goes to a high signal level, the output of AND gate 731 being connected to the clock input of flip flop 660, thereby clocking flip flop 660 to load the data present at its data input, and causing the modulo four counter comprised of flip flops 732 and 733, to be incremented thereby. The noninverting outputs from flip flops 732 and 733, are connected to the select inputs of multiplexer 720 and 725, and are also connected to the control select inputs of binary to one of four decoder 726. The noninverting outputs of flip flops 732 and 733, selects one of four groups of four bit program counter data to be multiplexed from the program counter of FIG. 8, via multiplexers 720 and 725, and output from multiplexer 720 and 725. The four bits output from 720 and 725 are connected to the four parallel data load inputs of shift register latch 724. State 0 signal 692 is connected to the load input of shift register/latch 724, and causes the data present at the four parallel load data inputs to be latched into register 724 during state 0 of the present cycle. Unload address instruction decode status signal 719 UNDLM2, is connected to one input of AND gate 723 and one input of AND gate 721. The other input of AND gate 723 is connected to the state 3 to state 6. $\overline{\phi 1}$ signal 671. The output of AND gate 723 is connected to the clock input of register 724. During an unload address command, the four successive clock pulses occurring on state 3 to state $\overline{6.\phi 1}$ signal 671 are gated by AND gate 723 to its output and therefrom to the clock input of shift register 724, causing the data latched from the parallel load inputs to be shifted out serially one bit per clock pulse, via output 773, PC DATA, output 773, connecting to the input of buffer 667, and therethrough. Buffer 667 is enabled by PC OUT 772, through buffer 663 and 664, to pass data to the EXT bus 670 of connector 600 and therefrom to the calculator. At the end of the present cycle, cycle 3, the unload status decode signal $\overline{\text{UNLDM2}}$ 729 returns to a high signal level, thereby clearing register latch 724, $\overline{\text{UNLDM2}}$ 729 being connected to the clear input of register 724. Additionally, the noninverting inputs of flip flops 732 and 733 are connected to the control select inputs of two to four decoder 726. The outputs $\overline{\text{LD1}}$ 774, $\overline{\text{LD 2}}$ 775, $\overline{\text{LD 3}}$ 776, and $\overline{\text{LD 4}}$ 777, are connected to the load control inputs of BCD program counters 800, 801, 802 and 803, respectively, shown in FIG. 8, to enable one of the four BCD counters to be loaded with the incoming load address data from the EXT bus 670 of connector 600 as processed through the CROM emulator circuitry, and serially shifted into and parallel shifted out from register 850. The outputs of 726 are enabled by the gate select output of AND gate 744, which is connected to the gate select input of decoder 726. The inputs and AND gate 744 are connected to state $7.\overline{\phi2}$ signal 667 and LDM1 signal 665. Program counter data transmission from the calculator via the external bus is completed at the end of state 6 of cycle 2, so that when state $7.\overline{\phi2}$ signal 697 goes active high, data transmission has been completed. LDMI 695 is high during the load address instruction thereby gating state $7.\overline{\phi2}$ pulse signal 697 to the output of AND gate 744, and pulse enabling the outputs of 726, causing one output to go to an active low state in accordance with the binary code present at the select inputs. When outputs 774, 775, 776 or 777, from decoder 726 goes low, it causes the data present at the inputs of program counter latches 800, 801, 802 or 803, respectively, to be latched into and stored in the program counter latches.

FMID 693 and FHMID 694 are connected to the inputs of OR gate 700, such that during a fetch or fetch high instruction the output of OR gate 700 goes to a high signal level. The output of OR gate 700 is connected to the clock input of flip flop 701, and upon going to a high signal level latches a high level signal into latch 701. The inverting output of flip flop 701 is connected to the input of buffer 704, the output of buffer 704 is connected to the HOLD signal 755 of S 100 bus 100, which connects therefrom to CPU board 103, and causes the CPU board 103 to enter a $\overline{\text{HOLD}}$ state in which all CPU operations are suspended. This causes the CPU to return a PHLDA signal 756, which is connected to the bus 100, acknowledging the processor's entry into a suspended hold state. Signal 756 is connected to the clock input of flip flop 703. The data input of flip flop 703 is connected to the noninverting output of flip flop 701, such that upon signal 756 going to a high signal level, the data at the D input of flip flops 703 is latched and stored within flip flop 703, indicating a fetch or fetch high instruction is in progress. The noninverting output of flip flop 703 is connected to the output enable control of buffer 707, which, when high, enables buffer 707 to pass a low level signal to the S-100 bus 100, indicating the disabled status of the CPU. Additionally, address request AREQ 790 signal is connected to other portions of the CROM emulator board circuitry. The inverting output of flip flop 703 is connected to the input of buffer 705, the output of buffer 705 is connected to pull up resistor 706 to provide noise immunity, and is also connected to the output enable control inputs of buffers 741, 742 and 743, transmitting predetermined hard wired control and address signals onto the S-100 bus 100. Address select plug 740 allows hard wired selection of the most significant address bits to be transmitted via the S-100 bus 100 to the memory board, thereby selecting a particular memory board within the S-100 bus system as the CROM emulator RAM board 105.

Referring now to FIG. 8, a detailed schematic of the program counter and BCD to binary conversion circuitry of the CROM emulator board 101 is shown. EXTIN signal 672, representing program counter data transmitted from the programmable calculator during a load instruction, is connected to the serial input of shift register 850. State 3 to state $6\overline{\phi2}$ signal 653, is connected to the shift clock input of shift register 850, such that during $\overline{\phi} 2$ of each of states 3 to state 6, the data present at the serial input of shift register 850 is clocked into and shifted over one position within register 850. Thus, at state 7 of machine cycle 2 of a load instruction, the load address program counter data transmitted from the calculator is present in parallel at the four outputs of shift register 850. The four outputs of shift register 850 are connected in parallel to the four parallel load inputs on each of register counters 800, 801, 802 and 803. During cycle 2 of a load instruction, at state $7\overline{\phi2}$, the data output from shift register 850 is latched into BCD Program counters 800, 801 802 or 803, in response to the load control output selection $\overline{\text{LD1}}$ 774, $\overline{\text{LD2}}$ 775, $\overline{\text{LD3}}$ 776, or $\overline{\text{LD4}}$, 777, respectively, as output from load state decoder 726. The programmable calculator transmits four consecutive load address instructions thereby filling all four digits of the BCD program counter comprised of 800, 801, 802 and 803. Additionally, during a fetch instruction, signal $\overline{\text{FMID}}$ 660 connected to the clear inputs of load digit counter 732 and 733, causes the load counter 732 and 733 to be reset to output low level signals, thereby selecting $\overline{\text{LD1}}$ 774 output from load decoder 726. Thus, at the end of a series of four load address instructions, or at the end of a fetch instruction, the load program counter selection counter comprised of flip flop 732 and 733, are encoded to select the least significant digit of the program counter 800, 801, 802 and 803, when decoder 726 is enabled.

AND gate 851 has connected to its inputs FM2 760 and state 7 signal 683, such that during state 7 of a fetch instruction, the output of AND gate 851 goes to a low signal level. The output of AND gate 851 is connected to the clock input of program counter 800, so that when the output from gate 851 goes low, the program counter comprised of counters 800, 801, 802 and 803, is incremented. Thus, the fetch instruction effectuates incrementation of the program counter contained on the CROM emulator board. BCD program counter outputs 820, 821, 822 and 823, are connected to four of eight address inputs of BCD to binary decoder PROM 804, while the next most significant digit of the program counter, counter 801, has its outputs 824, 825, 826 and 827, connected to the other four inputs of PROM 804. Outputs 830, 831, 832 and 833, from program counter 802, representing the next most significant BCD digit or connected to four of eight address inputs of BCD to binary conversion PROM 805, and are additionally connected to four of the 9 inputs of BCD to binary conversion PROM 806. Outputs 834, 835, 836 and 837, of the most significant digit BCD program counter 803, are connected to the other four inputs of PROM 805, and are also connected to four of the five remaining inputs of PROM 806; the additional input to PROM 806 is connected to the carry output from adder 808. PROMs 804 and 805 are permanently selected; the select inputs from each PROM connected to its active signal level. The select input to PROM 806 is connected to $\overline{AREQ}$ signal 791 such that during states 3 to 6 of a fetch increment or a fetch high instruction, outputs 848, 849, 860, 861 and 862, of PROM 806, are active and output to S-100 bus 100, and therefrom to RAM board 105. The four least significant bits output from each of PROMs 804 and 805 are connected to the register A and register B inputs, respectively, of adder 807, such that corresponding bit positions are added. The most significant four bits of outputs from each of PROMs 804 and 805 are connected to the A register and B register inputs, respectively, of adder 808, such that corresponding bit positions are added. The carry output from 807 is connected to the carry input of adder 808, and the carry output from adder 808 is connected to the most significant address bit input of PROM 806. PROMs 804, 805 and 806, in conjunction with adders 807 and 808, perform the function of four digit BDC to 12 digit binary code conversion which is compatible with the S-100 bus standard, and is necessary to interface to RAM board 105 via S-100 bus 100. The adder outputs from adder 807, and the two most significant adder outputs from adder 808 are connected to separate inputs of HEX buffer device 810, while the most significant two bits of adder outputs from adder 808 are connected to the inputs of two of the six buffers in HEX buffer 811 device. $\overline{AREQ}$ 791 is connected to the output enable control input of buffers 810 and 811, which enables the three state buffers within devices 810 and 811 to pass the decoded address information to its outputs 840, 841, 842, 843, 844 and 845, of device 810, and outputs 846 and 847 of device 811, which outputs are connected to S-100 bus 100 for connection therefrom to RAM board 105. Thus, the address is transmitted to RAM board 105 during states 3 through state 6 of a fetch and increment or a fetch high instruction, thereby causing RAM board 105 to respond with valid data during that time for transmission back to the calculator.

Various embodiments of the method and system of the present invention have now been described in detail. Since it is obvious that many modifications may be made to said details without departing from the nature and spirit or intent of the invention, it is understood that the invention is not to be limited to said details except as set forth in the Appended claims.

What is claimed is:

1. A system, used externally in conjunction with a programmable calculator containing an external control read only memory port and a control read only memory for generating instruction and clock signals, for emulating and developing control read only memory of said calculator, comprising:
    (A) means for connection to an external control read only memory port of a programmable calculator for receiving said instruction and clock signals,
    (B) means for emulating an external control read only memory for said calculator coupled to said means for connection said means for emulating comprising:
        (1) interface controller means connectable to said port of said calculator for decoding instruction commands received from said calculator via said port for providing selected data via said port to said calculator for execution therein in response to said instruction commands; and
        (2) memory means, coupled to said controller means for providing to said controller means prestored data corresponding to a control read only memory program, in a sequence addressed by said controller means, said controller means including means for decoding said data from said memory means and for transmitting said data to said calculator via said port, whereby said control read only memory of said programmable calculator is being replaced by the memory means.

2. A system as in claim 1 wherein the memory means is a random access read-write memory.

3. A system as in claim 1 wherein the memory means is a non-volatile random access memory.

4. A system as in claim 1 wherein said interface controller means further comprises:
    (a) input buffer means, coupled to said means for connection, for converting voltage levels of received instruction and clock signals;
    (b) instruction decode means, connected to the input buffer means, for evaluating an incoming instruction signal pattern of said instruction signals and for providing a signal indicative of the evaluated instruction on a status line for the evaluated instruction, each evaluated instruction having a separate status line;
    (c) clock timing decode means, coupled to said instruction decode means and to said input buffer means, said clock timing decode means for selectively buffering, decoding, accumulating, and outputting clock cycle and cycle state status signals responsive to said clock signals;
    (d) output buffer means coupled to said means for connection for converting voltage levels of received signals; and
    (e) program counter means, coupled to said instruction decode means, to said input and output buffer means and to said clock decode timing means, said program counter means including means for selectively storing and means for selectively outputting addresses of current and next data storage words to be accessed, responsive to said status line signals.

5. The system according to claim 4 wherein said program counter means further includes means for functioning as a counter, sequentially incrementing in response to said status line signals, providing for automatic program counter operation.

6. The system according to claim 1, which system further comprises:
    (a) input means for providing alphanumeric source code data entry;
    (b) a control read only memory software development means coupled to said memory means, and to said interface controller means, said development means for translating said alphanumeric source code data entry into calculator binary code and for formatting said calculator code in said memory means in a pattern corresponding to a control read only memory format,
    (c) control means coupled to said development means, sharing said memory means, with said interface controller means, for allowing for relatively fast alternating access of said memory means by said interface controller means and said software development means responsive to a priority request signal, said interface controller means including means for outputting said priority request signal.

7. The system according to claim 6 wherein said software development means further comprises:

a multiconductor interface bus providing common connection points for signals within said software development system, and connected to said interface controller means and to said memory means, a non-volatile storage memory connected to said interface bus containing a stored binary pattern, a central processing unit connected to said interface bus, said central processing unit for accessing said stored code from said non-volatile memory, for responding to said code stored in said non-volatile memory and effectuating translation of said alpha-numeric source code to said binary calculator code and for formatting said calculator code within said memory means in a control read only memory pattern compatible with said interface controller means, said central processing unit halting operation of the software development system and relinquishing control of said interface bus in response to said priority request signal for said data memory means, and keyboard and video interface means, coupled to said interface bus, providing for connection to a system keyboard and to a video monitor, said keyboard and video interface means buffering data entries of said alphnumeric source code from said keyboard to said interface bus, and therefrom to said central processing unit for analysis and translation, said keyboard and video interface means buffering data from said interface bus from said central processing unit, said non-volatile storage memory, or said memory means, said video interface means for converting said data into video control signals, and for outputting said video control signals to said video monitor for displaying the converted data.

8. The system according to claim 7 wherein the software development system further includes external tape storage interface means coupled to said central processing unit, and providing for connection to an external tape storage medium, providing for external tape storage of said calculator code and for a gate placement code, said external tape being utilized for subsequent software development and mass generation of a control read only memory containing said calculator code as stored in said data memory means.

9. A method of developing and testing control read only memory calculator code patterns for a calculator containing an external control read only memory port and a control read only memory comprising:

inputting alpha-numeric data corresponding to calculator source program, into a data processing system, translating in said data processing system said calculator source program into calculator object program corresponding to a control program of a calculator read only memory, storing said calculator object program in a random access read-write memory of the data processing system, connecting the random access read-write memory to said external control read only memory port of said calculator such that said calculator control read only memory is being replaced by the random access memory, executing said calculator object code data stored in said read-write memory within a calculator, testing and correcting said calculator object program executing in said calculator, translating in said data processing system said corrected calculator object program into a gate placement code for mass generation of control read only memories, outputting said gate placement code to an external non-volatile storage medium, creating control read only memory modules containing the calculator object code from said gate placement code, inserting said control read only memory containing said corrected object program in said calculator for final test and verification.

10. A method of developing a control read only memory for replacing the ROM within a calculator which comprises an external control read only memory port comprising:

inputting alpha-numeric data corresponding to source program into a data processing system, translating said source program into object program for said calculator, storing said calculator object program in a memory means of a data processing system, connecting the random access read-write memory to said external control read only memory port of said calculator such that said calculator control read only memory is being replaced by the random access memory, executing said calculator object program stored in said memory means within said calculator, testing and correcting said calculator object program executing in said calculator, translating said corrected calculator object program into a gate placement code for mass generation of intergrated circuit control read only memories, outputting said gate placement code to an external non-volatile storage medium, fabricating control read only memory modules containing said corrected calculator object program from said gate placement code.

11. The system as in claim 1 further comprising:

programmable calculator means having said control read only memory port, said port being coupled to said interface controller means, said programmable calculator means including means for executing said selected data received via said port as a program in the same manner as if said data were eminating from a control read only memory coupled to said port.

12. The system as in claim 6 further comprising:

programmable calculator means having said control read only memory port, said port being coupled to said interface controller means, said program calculator means including means for executing said selected data received via said port as a program in the same manner as if said data were eminating from a control read only memory coupled to said port.

13. The system as in claim 12 wherein said means for executing provides for execution of said selected data in a real time mode as said selected data is received, said selected data being received sequentially following said priority request signal.

* * * * *